(12) United States Patent
Brevick

(10) Patent No.: US 11,692,599 B1
(45) Date of Patent: Jul. 4, 2023

(54) DUAL DIRECTION, SELECTABLE ONE-WAY CLUTCH

(71) Applicant: Schaeffler Technologies AG & Co. KG, Herzogenaurach (DE)

(72) Inventor: John Brevick, Newaygo, MI (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 17/591,804

(22) Filed: Feb. 3, 2022

(51) Int. Cl.
  *F16D 41/16* (2006.01)
  *F16D 23/14* (2006.01)
  *F16D 23/12* (2006.01)

(52) U.S. Cl.
  CPC ............ *F16D 41/16* (2013.01); *F16D 23/14* (2013.01); *F16D 2023/123* (2013.01); *F16D 2023/141* (2013.01)

(58) Field of Classification Search
  CPC ............... F16D 41/12–16; F16D 23/14; F16D 2023/123; F16D 2023/141
  See application file for complete search history.

(56) References Cited

U.S. PATENT DOCUMENTS

| | | | |
|---|---|---|---|
| 10,006,507 B2* | 6/2018 | Lee | F16D 41/12 |
| 2016/0201738 A1* | 7/2016 | Kimes | F16D 41/125 |
| | | | 192/84.8 |
| 2017/0138416 A1* | 5/2017 | Lee | F16D 23/14 |
| 2017/0343061 A1* | 11/2017 | Campton | F16D 41/16 |
| 2018/0010651 A1* | 1/2018 | Kimes | F16D 23/02 |

* cited by examiner

*Primary Examiner* — David R Morris
(74) *Attorney, Agent, or Firm* — Volpe Koenig

(57) ABSTRACT

A dual direction, selectable one-way clutch is provided that can be set to be fully free to rotate in both directions, can be fully locked in both directions, and can provide a one-way clutch option in both directions. The actuator to change the clutch state is an electromechanical and only requires power to change a coupling state of the clutch. The clutch is formed by two sets of gear plates and corresponding engagement pawls that are engageable/disengageable in order to provide for the different locked and one-way clutch states. One or more actuator rings are provided to activate or disengage the pawls.

20 Claims, 3 Drawing Sheets

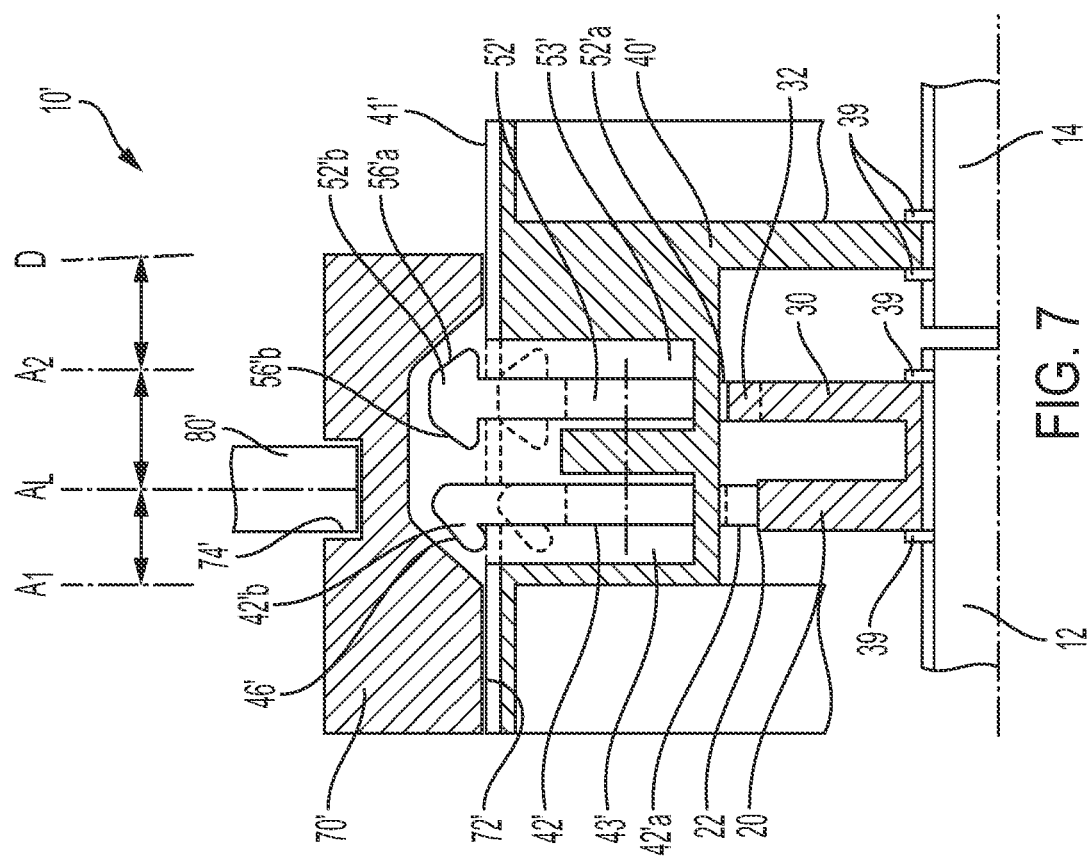

DUAL DIRECTION, SELECTABLE ONE-WAY CLUTCH

FIELD OF INVENTION

The disclosure relates to a one-way clutch with the capability to fully disconnect, as well as connect in both directions for both grounding as well as two concentric rotating shafts.

BACKGROUND

Selectable one-way clutches have many applications in conventional automatic transmissions as well as battery electric vehicle axles. The conventional clutch requires a hydraulic pump, passages, controls, piston, and wet clutch pack with a large package size, and is subject to parasitic losses (open clutch drag and hydraulic pump power).

Roller one-way clutches provide good function, but the torque capability relies on friction. One-way clutches with a ratcheting pawl as the driver can carry substantial torque in a small package, but are typically passive.

It would be desirable to find a cost-effective solution to provide additional features in a clutch, such that the coupling created by the clutch has the ability to rotate fully free in both directions, to be fully locked in both directions, as well as to provide a one-way clutch option in either direction.

SUMMARY

According to the disclosure, a dual direction, selectable one-way clutch is provided that can be set to be fully free to rotate in both directions, can be fully locked in both directions, and can provide a one-way clutch option in both directions. The actuator to change the clutch state is preferably electromechanical and only requires power to change a coupling state of the clutch. The present clutch architecture functions with two concentric rotating shafts, as well as in a grounding (i.e., shaft fixing to a housing or chassis) state.

In one aspect, a dual direction, selectable one-way clutch, is provided having first and second concentric shafts with a first gear plate rotationally fixed to the first shaft. The first gear plate includes a plurality of first teeth on a radially outer surface, each of the first teeth having a drive engagement profile on a first tooth flank that faces in a first rotational direction and a cam profile on a second tooth flank. A second gear plate is also rotationally fixed to the first shaft, with the second gear plate including a plurality of second teeth on a radially outer surface, each of the second teeth having a drive engagement profile on a second tooth flank and a cam profile on a first tooth flank. The second tooth flanks of the plurality of second teeth face in a second, opposite rotational direction from the first tooth flanks of the plurality of first teeth. A pawl plate is rotationally fixed to the second shaft, and a plurality of first pawls are pivotally connected to the pawl plate. Each first pawl has a first end that is configured to engage with a respective one of the drive engagement profiles on the first tooth flanks of the first teeth of the first gear plate in an engaged position and has a second actuation end, opposite the first end, that extends radially outwardly to an activated position and is movable radially inwardly to a deactivated position such that the first end is disengaged from the respective drive engagement profile on the first tooth flanks of the first teeth. A first spring is associated with each of the first pawls that biases the first ends of the first pawls into the engaged positions. A plurality of second pawls are also pivotally connected to the pawl plate, with each second pawl having a first end that is configured to engage with a respective one of the drive engagement profiles on the second tooth flanks of the second teeth of the second gear plate in an engaged position and having a second actuation end, opposite the first end, that extends radially outwardly to an activated position and is movable radially inwardly to a deactivated position such that the first end of the second pawl is disengaged from the respective drive engagement profiles on the second tooth flanks of the second teeth. A second spring is associated with each of the second pawls that biases the first ends of the second pawls into the engaged positions. A first actuator ring is provided that is axially movable between an actuated position, in which the second ends of the first pawls are in the activated position, and a disengaged position, in which the first actuator ring presses the second ends of the first pawls radially inwardly to the deactivated position such that the first ends of the first pawls are disengaged from the respective drive engagement profiles on the first tooth flanks of the first teeth. A second actuator ring is provided that is axially movable between an actuated position, in which the second ends of the second pawls are in the activated position, and a disengaged position, in which the second actuator ring presses the second ends of the second pawls radially inwardly to the deactivated position such that the first ends of the second pawls are disengaged from the respective drive engagement profiles on the second tooth flanks of the second teeth.

With this arrangement, when the first and second actuator rings are both in the actuated position, a fully locked connection is provided between the first and second shafts in both rotational directions. Additionally, when the first actuator ring is in the actuated position and the second actuator ring is in the disengaged position, a one-way clutch is provided that is active for transferring force only in the first rotational direction. Further, when the first actuator ring is in the disengaged position and the second actuator ring is in the actuated position, a one-way clutch is provided that is active for transferring force only in the second rotational direction. Finally, with the first and second actuator rings are both in the disengaged position, the first and second shafts are freely rotatable relative to one another in both rotational directions.

In one embodiment, the first and second actuator rings include splined radially inner surfaces that slidingly engage on a splined radially outer surface of the pawl plate.

In one arrangement, at least one actuator is connected to the first and second actuator rings to axially move the first and second actuator rings between the respective actuated and disengaged positions.

In one embodiment, the at least one actuator comprises respective first and second actuators that are engaged, respectively, with the first actuator ring and the second actuator ring. More preferably, the first actuator comprises a first solenoid connected to a first fork that engages a groove in a radially outer surface of the first actuator ring, and the second actuator comprises a second solenoid connected to a second fork that engages a groove in a radially outer surface of the second actuator ring.

In order to only require power during the active switching of the states of the two actuator rings, the first fork is connected to a first solenoid shaft, and the first solenoid shaft includes detents for the actuated and disengaged positions of the first actuator ring, and the second fork is connected to a second solenoid shaft, and the second solenoid shaft includes detents for the actuated and disengaged positions of the second actuator ring. Spring loaded balls or other detent engagement elements such as a pin or projection engage in the detents in order to hold the respective solenoid shafts axially in position when the solenoids are not being actuated.

On one aspect, the first and second shafts are both rotatable. The dual direction, selectable one-way clutch acts to enable transmission of rotary force in either rotational direction as a one-way clutch, in both rotational directions in a fully locked state, or allows relative rotation of both shafts in either direction relative to one another in a deactivated state. One shaft could also be fixed, such that in a fully locked state, the other shaft is fixed to the housing or chassis to provide a "grounded" state.

In one embodiment, the pawl plate includes a plurality of pockets on each axial side, and the first pawls are located in the pockets on one of the axial sides, and the second pawls are located in the pockets on an opposite one of the axial sides from the first pawls.

Preferably, the first and second pawls are arranged in axially aligned pairs, and a single pivot pin connects each of the aligned pairs of the first and second pawls to the pawl plate.

Preferably, the first and second gear plates are rotationally fixed to the first shaft via a form fit or an interference fit.

In one embodiment, the second ends of the first pawls each include a first ramp surface, and at least a part of a radially inner surface of the first actuator ring includes a corresponding ramp surface that engages with the first ramp surfaces as the first actuator ring moves to the disengaged position.

Additionally, the second ends of the second pawls can each include a second ramp surface, and at least a part of a radially inner surface of the second actuator ring includes a corresponding ramp surface that engages with the second ramp surfaces as the second actuator ring moves to the disengaged position.

In a further embodiment, a dual direction, selectable one-way clutch is provided having first and second concentric shafts. A first gear plate is rotationally fixed to the first shaft, with the first gear plate including a plurality of first teeth on a radially outer surface, each of the first teeth having a drive engagement profile on a first tooth flank that faces in a first rotational direction and a cam profile on a second tooth flank. A second gear plate rotationally is also fixed to the first shaft, with the second gear plate including a plurality of second teeth on a radially outer surface, each of the second teeth having a drive engagement profile on a second tooth flank and a cam profile on a first tooth flank. The second tooth flanks of the plurality of second teeth face in a second, opposite rotational direction from the first tooth flanks of the plurality of first teeth. A pawl plate is rotationally fixed to the second shaft. A plurality of first pawls are pivotally connected to the pawl plate, with each first pawl having a first end that is configured to engage with a respective one of the drive engagement profiles on the first tooth flanks of the first teeth of the first gear plate in an engaged position and having a second actuation end, opposite the first end, that extends radially outwardly to an activated position and is movable radially inwardly to a deactivated position such that the first end is disengaged from the respective drive engagement profile on the first tooth flanks of the first teeth. A respective first spring is associated with each of the first pawls that biases the first ends of the first pawls into the engaged positions. A plurality of second pawls are pivotally connected to the pawl plate, with each second pawl having a first end that is configured to engage with a respective one of the drive engagement profiles on the second tooth flanks of the second teeth of the second gear plate in an engaged position, and having a second actuation end, opposite the first end, that extends radially outwardly to an activated position and is movable radially inwardly to a deactivated position such that the first end of the second pawl is disengaged from the respective drive engagement profiles on the second tooth flanks of the second teeth. A respective second spring is associated with each of the second pawls that biases the first ends of the second pawls into the engaged positions. An actuator ring is provided that is axially movable between: (a) a first actuated position, in which the second ends of the first pawls and the second ends of the second pawls are in the activated position providing a fully locked connection between the first and second shafts in both rotational directions; (b) a first one-way clutch position, in which the second ends of the first pawls are in the activated position and the second ends of the second pawls are in the deactivated position for transferring force only in the first rotational direction; (c) a second one-way clutch position, in which the second ends of the first pawls are in the deactivated position and the second ends of the second pawls are in the activated position for transferring force only in the second rotational direction; and (d) a freewheel position, in which the first and second pawls are in the deactivated position such that the first and second shafts are freely rotatable relative to one another in both rotational directions.

In one aspect, the actuator ring includes a splined radially inner surfaces that slidingly engages on a splined radially outer surface of the pawl plate.

In a further embodiment, an actuator is provided that is connected to actuator ring to axially move the actuator ring between the first actuated position, the first one-way clutch position, the second one-way clutch position, and the freewheel position.

Preferably, the actuator comprises a solenoid connected to a fork that engages a groove in a radially outer surface of the actuator ring.

Preferably, the fork is connected to a solenoid shaft, and the solenoid shaft includes detents for the first actuated position, the first one-way clutch position, the second one-way clutch position, and the freewheel position.

In one embodiment, the pawl plate includes a plurality of pockets on each axial side, and the first pawls are located in the pockets on one of the axial sides, and the second pawls are located in the pockets on an opposite one of the axial sides from the first pawls.

In one embodiment, the first and second pawls are arranged in axially aligned pairs, and a single pivot pin connects each of the aligned pairs of the first and second pawls to the pawl plate.

Other advantages provided by the present dual direction, selectable one-way clutch are that the electromechanical actuation only requires power to change state. Further, there is low friction torque in the open, deactivated state. There is also the possibility of fast state changes, and low lash in the fully locked (connected in both directions) state. This arrangement is also scalable for various torque requirements.

Various features of the invention can be used alone or in combination in order to achieve one or more of the benefits described herein.

BRIEF DESCRIPTION OF THE DRAWINGS

The foregoing Summary and the following detailed description will be better understood when read in conjunction with the appended drawings, which illustrate exemplary embodiments according to the disclosure. In the drawings:

FIG. 6 is a side view showing a solenoid actuator including a solenoid shaft and an actuation fork.

FIG. 7 is a cross-sectional view of a second embodiment of a dual direction, selectable one-way clutch.

DETAILED DESCRIPTION

Figures 1, 2:
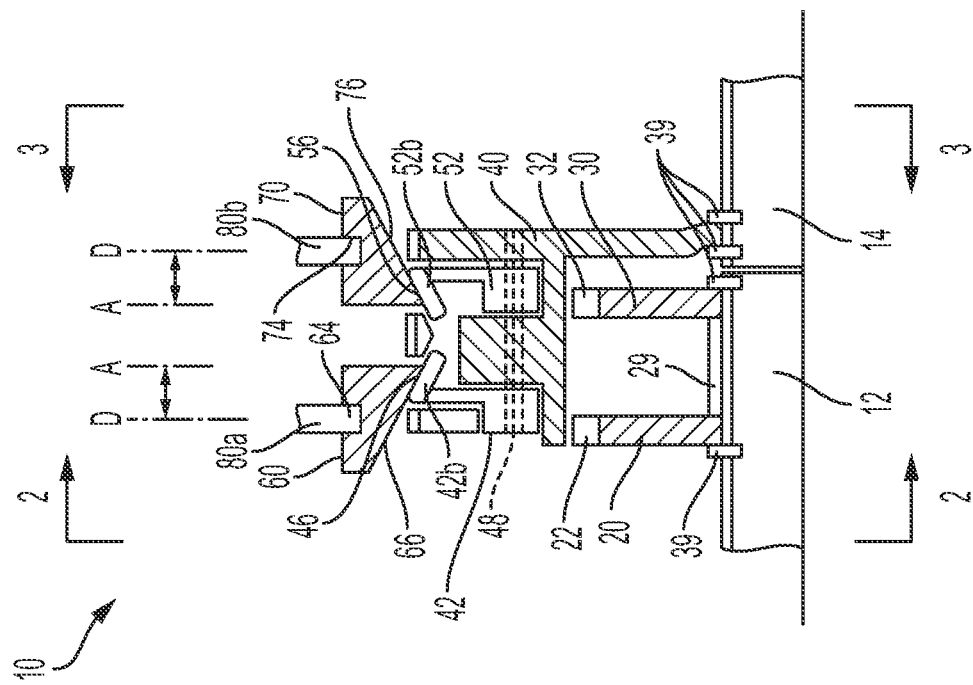
FIG. 1 is a cross-sectional view, in half-section, of a dual direction, selectable one-way clutch in accordance with a first embodiment.
FIG. 2 is a side view taken along line 2-2 in FIG. 1.
Figure 4:
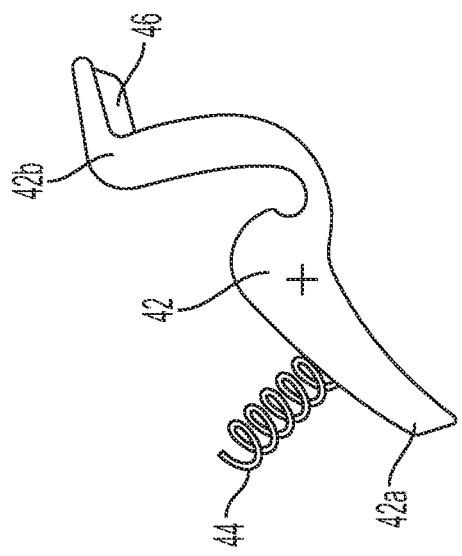
FIG. 4 is a detailed view of a pawl used in the dual direction, selectable one-way clutch shown in FIGS. 1-3.

Certain terminology is used in the following description for convenience only and is not limiting. The words "inwardly" and "outwardly" refer to directions toward and away from the parts referenced in the drawings. "Axially" refers to a direction along the axis of a shaft. "Radially" refers to a direction normal to an axis. A reference to a list of items that are cited as, for example, "at least one of a or b" (where a and b represent the items being listed) means any single one of the items a or b, or a combination of a and b thereof. This would also apply to lists of three or more items in like manner so that individual ones of the items or combinations thereof are included. The terms "about" and "approximately" encompass + or −10% of an indicated value unless otherwise noted. The terminology includes the words specifically noted above, derivatives thereof and words of similar import.

Figure 3:
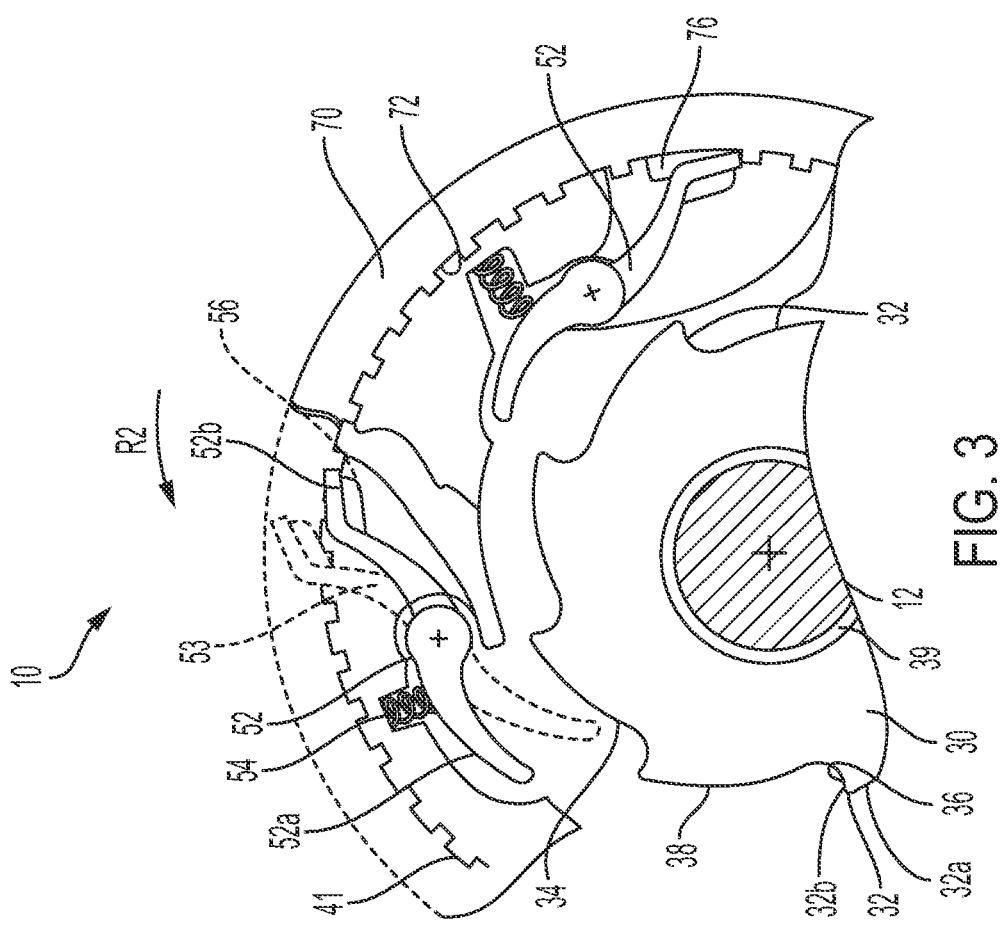
FIG. 3 is a side view taken along line 3-3 in FIG. 1.

Referring to FIGS. 1-3, a first embodiment of a dual direction, selectable one-way clutch 10 ("clutch 10") is shown. The clutch 10 includes first and second concentric shafts 12, 14. In one embodiment, both the first and second concentric shafts 12, 14 are rotatable. However, it is possible that one of the shafts 12, 14 could be fixed to a housing or chassis and be grounded, such that when the clutch 10 is activated, the functions are a one-way clutch for the non-grounded shaft in one or the other direction, fixing the non-grounded shaft, or allowing free rotation of the non-grounded shaft.

Still with reference to FIGS. 1-3, a first gear plate 20 is rotationally fixed to the first shaft 12. The first gear plate 20 includes a plurality of first teeth 22 on a radially outer surface 24 thereof. Each of the first teeth 22 have a drive engagement profile 26 on a first tooth flank 22a that faces in a first rotational direction R1 and a cam profile 28 on a second tooth flank 22b. The drive engagement profile 26 can be as shown. However, any positive angle of the tooth flank 22a relative to a radial line extending through a center of a first gear plate in order to allow for positive engagement of a pawl (described in further detail below) can be used as the drive engagement profile. The cam profile 28 on the second tooth flank 22b can also be as shown. However, the cam profile can be any profile that minimizes ratcheting noise, preferably with low drag, of an engaged pawl when the rotation is in a direction opposite to the engagement direction, also described in further detail below.

A second gear plate 30 is rotationally fixed to the first shaft 12. The second gear plate 30 includes a plurality a second teeth 32 on a radially outer surface 34 thereof, with each of the second teeth 32 having a drive engagement profile 36, similar to the drive engagement profile 26 discussed above, on a second tooth flank 32b thereof and a cam profile 38, which is similar to the cam profile 28 discussed above, on a first tooth flank 32a thereof. The second tooth flank 32b of the plurality of second teeth 32 faces in a second, opposite rotational direction R2 from the first tooth flanks 22a of the plurality of first teeth 22.

The engagement of the first and second gear plates 20, 30 to the first shaft 12 is preferably provided by a splined connection at least on the end of the first shaft 12 which can include axially extending splines that are engaged by a corresponding splined profile on a radially inner surface of the first and second gear plates 20, 30. The first and second gear plates 20, 30 may be formed as one piece or may be formed as separate pieces and provided with a spacer 29 therebetween. Lock rings 39 that engage in radial grooves in the shaft 12 can be used to hold the first and second gear plates 20, 30, as well as the spacer 29 if used, axially in position on the end of the first shaft 12. Other fixing means such as an interference fit, shrink fit, or a welded connection could also be used.

Still with reference to FIGS. 1-5, a pawl plate 40 is rotationally fixed to the second shaft 14. As shown in FIGS. 1 and 2, a plurality of first pawls 42 are pivotally connected to the pawl plate 40. Each first pawl 42, shown in detail in FIG. 4, has a first end 42a that is configured to engage with a respective one of the drive engagement profiles 26 on the first tooth flank 22a of the first teeth 22 of the first gear plate 20 in an engaged position and has a second actuation end 42b, opposite the first end 42a, that extends radially outwardly to an activated position (shown with broken lines in FIG. 2) and is moveable radially inwardly to a deactivated position such that the first end 42a is disengaged from the respective drive engagement profile 26 on the first tooth flanks 22a of the first teeth 22. A first spring 44 is associated with each of the first pawls 42 and biases the first end 42a of the first pawl 42 into the engaged positions.

Referring to FIGS. 1 and 3, a plurality of second pawls 52 are pivotally connected to the pawl plate 40. Each of the second pawls 52 as a first end 52a that is configured to engage with a respective one of the drive engagement profiles 36 on the second tooth flank 32b of the second teeth 32 of the second gear plate 30 in an engaged position and have a second actuation and 52b, opposite the first end 52a that extends radially outwardly to an activated position (shown with broken lines in FIG. 3) and is moveable radially inwardly to a deactivated position such that the first end 52a of the second pawl 52 is disengaged from the respective drive engagement profile 36 on the second tooth flank 32b of the second teeth 32. A second spring 54 is associated with each of the second pawls 52 and bias the first ends 52a of the second pawls 52 into the engaged position.

As shown in FIGS. 1-3, the first and second pawls 42, 52 are preferably arranged in axially aligned pairs, and a single pivot pin 48 connects each of the aligned pairs of the first and second pawls 42, 52 to the pawl plate. However, other arrangements with the pawls 42, 52 mounted on separate pivot pins are also possible.

Additionally, as shown in detail in FIGS. 1-3, the pawl plate 40 preferably includes a plurality of pockets 43, 53 on each axial side, and the first pawls 42 are located in the pockets 43 on one of the axial sides, and the second pawls 52 are located in the pockets 53 on an opposite axial side from the first pawls 42. However, as will be recognized by those skilled in the art, the pockets are not required and the pawl plate 40 can be configured as a central support plate located axially between the first pawls 42 and the second pawls 52 with appropriate stops located on the plate 40.

Referring to FIGS. 1 and 2, a first actuator ring 60 is axially moveable between an actuated position A, in which the second ends 42b of the first pawls 42 are in the activated position, and a disengaged position D, which the first actuator ring 60 presses the second ends 42b of the first pawls 42 radially inwardly to the deactivated position such that the first ends 42a of the first pawls 42 are disengaged from the respective drive engagement profiles 26 on the first two flanks 22a of the first teeth 22.

In the first embodiment of the clutch 10, a second actuator ring 70, indicated in FIGS. 1 and 3, it is provided that it is axially moveable between an actuated position A, in which the second ends 52b of the second pawls 52 are in the activated position, and a disengaged position D, in which the second actuator ring 70 presses the second ends 52b of the second pawls 52 radially inwardly to the deactivated position D such that the first ends 52a of the second pawls 52 are disengaged from the respective drive engagement profiles 36 on the second tooth flanks 32b of the second teeth 32.

As shown in FIGS. 2 and 3, the first and second actuator rings 60, 70 preferably include a splined radially inner surfaces 62, 72 that slidingly engage on a splined radially outer surface 41 of the pawl plate 40. This arrangement provides for axial movement of the first and second actuator ring 60, 70 while maintaining them in a rotationally fixed position for activating or disengaging the first and second pawls 42, 52, respectfully.

As shown in FIGS. 1-4, the second ends 42b of the first pawls 42 each include a first ramp surface 46, and at least a part of a radially inner surface 62 of the first actuator ring 60 includes a corresponding ramp surface 66 that engages with the first ramp surface 46 as the first actuator ring moves to the disengaged position D. These ramp surfaces 46, 66 allow for a smooth transition of the first pawls from the activated position A to the disengaged position D. Additionally, the second ends 52b of the second pawls 52 each include a second ramp surface 56, at least a part of a radially inner surface 72 of the second actuator ring 70 also includes a corresponding ramp surface 76 that engages with the second ramp surfaces 56 as the second actuator ring 70 moves to the disengaged position D. These ramp surfaces 56, 76 also provide for a smooth transition from the engaged position A to the disengaged position D. As will be understood from a review of FIGS. 1-3, the ramp surfaces 66, 76 only need to be located in the positions of the second ends 42b, 52b of the first pawls 42 and second pawls 52, respectively since the actuator rings 60, 70 are rotationally fixed but axially slidable on the outer surface of the pawl plate 40. Corresponding recesses are provided in the pawl plate 40 in these areas in order to allow for free engagement and disengagement of the ramp surfaces 66, 76 with the first and second ramp surfaces 46, 56.

Still with reference to FIG. 1, the radially inner surface of the pawl plate 40 preferably is formed as a splined surface that includes spines and the outer surface of the second shaft 14 includes correspondence splines such that the pawl plate 40 can be maintained in a rotationally fixed manner on the end of the second shaft 14. Locking rings 39 are also provided that engage in grooves in the second shaft 14 in the disclosed embodiment to hold the pawl plate 40 axially in position.

The clutch 10 provides the following functionality: when the first and second actuator rings 60, 70 are both in the actuated position, A, indicated in FIG. 1, this provides a fully lock connection between the first and second shafts 12, 14 in both rotational directions. When the first actuator ring 60 is in the actuated position A, and the second actuator ring 70, is in the disengaged position D, a one-way clutch is provided that is active for transferring force only in the first rotational direction R1. When the first actuator ring 60 is in the disengaged position D and the second actuator ring 70 is in the actuated position A, a one-way clutch is provided that is active for transferring force only in the second rotational direction R2. Finally, when the first and second actuator rings 60, 70 are both in the disengaged position D, the first and second shafts 12, 14 are freely rotatable relative to one another in both directions R1, R2.

Figure 5:
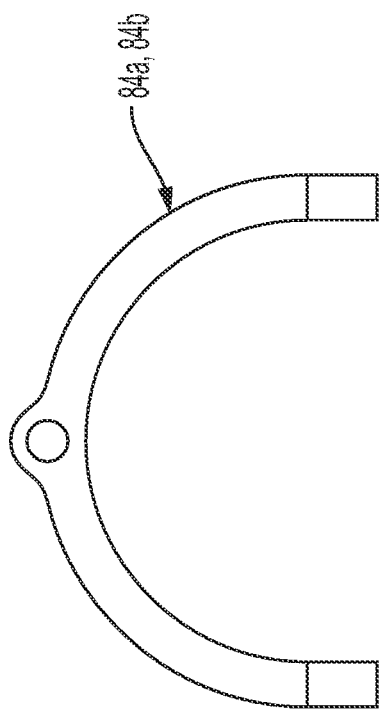
FIG. 5 is a detailed view showing an actuator fork used in connection with the dual direction, selectable one-way clutch shown in FIG. 1.

Referring to FIGS. 1, 5, and 6, at least one actuator 80a, 80b is connected to the first actuator ring 60 and the second actuator ring 70 in order to axially move the first and second actuator ring 60, 70 between the respective actuated and disengaged positions A, D. The at least one actuator preferably includes first and second actuators 80a, 80b, indicated only schematically in FIG. 1, with the first actuator 80a being connected with the first actuator ring 60 and the second actuator 80b being connected with the second actuator ring 70.

The first actuator 80a preferably includes a first solenoid 82a shown in FIG. 6 as well as a first fork 84a shown in detail in FIGS. 5 and 6 that engages in a groove 64 in a radially outer surface of the first actuator ring 60, as shown in FIG. 1. The second actuator 80b similarly includes a second solenoid 82b connected to a second fork 84b that engages a groove 74 in a radially outer surface of the second actuator ring 70, also shown in FIG. 1.

As shown in detail in FIG. 6, the first fork 84a is connected to the first solenoid shaft 86a and the first solenoid shaft 86a preferably includes detents 88a, 88d for the actuated and disengaged positions A, D of the first actuator ring 60. The second actuator 80b is similarly configured and includes the second fork 84b connected to a second solenoid 86b, with the second solenoid shaft 86b also including detents 88a, 88d for the actuated and disengaged positions A, D of the second actuator ring 70. While FIG. 6 only shows one embodiment for the first actuator 80a, 80b, other configurations can also be utilized. Additionally, the first and second solenoids 82a, 82b could be located spaced on opposite sides of the pawl plate 40 or could both be located on the same side of the pawl plate 40 with the solenoids 82a, 82b being radially displaced from one another.

As shown in FIG. 6, the detents 88a, 88b are preferably provided via a ball or pin element 90 that is biased via a spring 92 into axially offset grooves that form the detents 88a, 88b that are located in the solenoid shaft 86a, 86b. Using this arrangement, the solenoid shaft is held in either the actuated or disengaged positions A, D, and power is only required for the respective solenoid 82a, 82b to shift between the actuated and disengaged positions A, D. While solenoid actuators 80a, 80b are disclosed, other types of actuators could be used.

Referring now to FIG. 7, a second embodiment of the dual direction, selectable one-way clutch 10' ("clutch 10') is shown. The second embodiment of the cutch 10' is similar to the first embodiment of the clutch 10 and like elements have the same reference numbers while similar elements are designated with a prime.

As shown in FIG. 7, the clutch 10' includes the first and second concentric shafts 12, 14 as well as the first gear plate 20 and the second gear plate 30, as described above. Accordingly, the descriptions of the parts has not been repeated.

Still with reference to FIG. 7, a pawl plate 40' is rotationally fixed to the second shaft 14. A first plurality of pawls 42' are pivotably connected to the pawl plate 40', and each of the first pawls 42' has a first end 42'a that is configured to engage with a respective one of the drive engagement profiles 26 on the first tooth flanks 22a of the first teeth 22 of the first gear plate 20 in an engaged position, and have a second actuation end 42'b, opposite the first end 42'a, that extends radially outwardly to an activated position and is moveable radially inwardly to a deactivated position such that the first end 42'a is disengaged from the respective drive engagement profile 26 on the first tooth flanks 22a of the first teeth 22. The spring 44 is also provided and one spring 44 is associated with each of the first pawls 42' and bias the first ends 42a of the first pawls 42' into the engaged positions. The first pawls 42' may be similar to or identical with the first pawls 42 shown and described in connection with the first embodiment of the clutch 10.

Still with reference to FIG. 7, a plurality of second pawls 52' are pivotably connected to the pawl plate 40'. Each of the second pawls 52' has a first end 52' that is configured to engage with a respective one of the drive engagement profiles 36 on the second tooth flanks 32b of the second teeth 32 of the second gear plate 30 in an engaged position, and have a second actuation end 52'b opposite the first end 52'a, that extends radially outwardly to an activated position and is moveable radially inwardly to a deactivated position such that the first end 52'a of the second pawl 52' is disengaged from the respective drive engagement profiles 36 on the second tooth flanks 32b of the second teeth 32. One of the second springs 54 as discussed above is also associated with each of the second pawls 52' and biases the first ends 52'a of the second pawls 52' into the engaged positions. The second pawls 52' are similar to the second pawls 52 described above with the only exception being that the second ends 52'b of the second pawls 52' include two ramp surfaces 56'a and 56'b, with one of the ramp surfaces 56'a facing in a first axial direction of the clutch 10' and the second ramp surface 56'b facing in an opposite axial direction of the clutch 10'.

Still with reference to FIG. 7, for the clutch 10' a single actuator ring 70' is provided that is axially moveable between: (a) a first actuated position $A_L$, in which the second ends 42'b of the first pawls 42' and the second ends 52'b of the second pawls 52' are in the activated position providing a fully locked connection between the first and second shafts 12, 14 in both rotational directions R1, R2 (this position is illustrated in FIG. 7); (b) a first one-way clutch position $A_1$ in which the second ends 42'b of the first pawls 42' are in the activated position and the second ends 52'b and the second pawls 52 are in the deactivated position for transferring force only in the first rotational direction R1; (c) a second one-way clutch position $A_2$ in which the second ends 42'b of the first pawls 42' are in the deactivated position and the second ends 52'b of the second pawls 52' are in the activated position for transferring force only in the second rotational direction R2; and (d) a freewheel position D in which the first and second pawls 42', 52' are in the deactivated position such that the first and second shafts 12, 14 are freely rotatably relative to one another in both rotational directions R1, R2.

As shown in FIG. 7, the actuator ring 70' may include a splined radially inner surface 72' that slidingly engages on a splined radially outer surface 41' of the pawl plate 40'.

Still with reference to FIG. 7, the inner surface of the actuator ring 70' includes a first ramp surface 76'a that is adapted to engage with the first ramp surfaces 46' on the first pawls 42' as the actuator ring 70' moves to the second one-way clutch position $A_2$. The second ends 52'b of the second pawls 52' each include a first surface 56'a that is engaged by a corresponding second ramp surface 76'b of the actuator ring 70' as the actuator ring 70' is moved into the first one-way clutch position $A_1$ in order to deactivate the second pawls 52'. The actuator ring 70' can also move to the freewheel position D and during this movement, the first ramp surface 76'a would contact both the corresponding ramp surface 46' on the first pawl 42' as well as the second ramp surface 56'b on the second pawl as the actuator ring 70' presses both the first pawls 42' and the second pawls 52' into the deactivated position.

The clutch 10' can further include an actuator 80', similar to one of the actuators 80a, 80b discussed above, that is connected to the actuator ring 70' to axially move the actuator ring 70' between the first actuated position $A_L$, the first one-way clutch position $A_1$, the second one-way clutch position $A_2$, and the freewheel position D. The actuator 80' may include a solenoid 82' connected to a fork 84' that engages a groove 74' in a radially outer surface of the actuator ring 70'. Alternatively, the actuator 80' can be stepper motor driven linear actuator to allow movement to multiple repeatable positions. The fork 84' can be connected to a solenoid shaft 86', as discussed above and also indicated in FIG. 6, with the solenoid shaft 86' including detents for all four actuation positions (not separately indicated in FIG. 6, but also formed of grooves in the solenoid shaft and the corresponding spring activated ball or pin element 90 that is biased into the grooves via a spring 92). The solenoid 82' can be a multi-coil, multi-position solenoid so that the core/solenoid shaft 86' can be shifted between the different positions noted. With respect to a stepper motor driven linear actuator that is connected to the fork 84', positioning detents would not be required. Other types of actuators could also be used that provide position controlled axial displacement.

As shown in FIG. 7, the pawl plate 40' can also include a plurality of pockets 43', 53' on each axial side, with the first pawl 42' being located in the pockets 43' on one of the axial sides, and the second pawls 52' being located in the pockets 53' on the opposite axial side from the first pawls 42'.

As discussed above in connection with the clutch 10, in the second embodiment of the clutch 10' the first and second pawls 42', 52' are also preferably arranged in axially aligned pairs, and a single pivot pin 48 connects each of the aligned pairs to the first and second pawls 42', 52' to the pawl plate 40.

The advantage of the clutch 10' is that only a single actuator ring 70' is required in comparison to the clutch 10. However, the overall functionality is the same.

Having thus described the exemplary embodiments in detail, it is to be appreciated and will be apparent to those skilled in the art that many physical changes, only a few of which are exemplified in the detailed description, could be made without altering the inventive concepts and principles embodied therein. It is also to be appreciated that numerous embodiments incorporating only part of the disclosed embodiment are possible which do not alter, with respect to those parts, the inventive concepts and principles embodied therein. The present embodiments and optional configurations are therefore to be considered in all respects as exemplary and/or illustrative and not restrictive, the scope that is indicated by the appended claims rather than by the foregoing description, and all alternate embodiments and changes to this embodiment which come within the meaning and range of equivalency of said claims are therefore to be embraced therein.

LIST OF REFERENCE SYMBOLS 10, 10' Dual direction, selectable one-way clutch
12 shaft 14 shaft
20 first gear plate
22 first teeth
22a first tooth flank
22b second tooth flank
24 radially outer surface
26 drive engagement profile
28 cam profile
30 second gear plate
32 second teeth
32a first tooth flank
32b second tooth flank
34 radially outer surface
36 drive engagement profile
38 cam profile
39 lock rings
40, 40' pawl plate
41, 41' splined radially outer surface
42, 42' plurality of first pawls
42a, 42'a first end of 42
42b, 42'b second end of 42
43, 43' pockets
44 first spring
46 first ramp surface of 42
48 pivot pin
52, 52' plurality of second pawls
52a, 52'a first end of 52
52b, 52'b second end of 52
53, 53' pockets
54 first spring
56 second ramp surface
56'a, 56'b ramp surfaces
60 first actuator ring
62 splined radially inner surface
66 ramp surface
70 second actuator ring
70' actuator ring
72 splined radially inner surface
76 ramp surface
80' actuator
80a, 80b actuators
82a first solenoid
82b second solenoid
82' solenoid
84a first fork
84b second fork
84' fork
86, 86' solenoid shaft
88a, d detents
90 ball or pin element
92 spring
A actuated position
AL first actuated position
A1 first one-way clutch position
A2 second one-way clutch position
D disengaged position
R1 first rotational direction
R2 second rotational direction

The invention claimed is:

1. A dual direction, selectable one-way clutch, comprising:

first and second concentric shafts;
a first gear plate rotationally fixed to the first shaft, the first gear plate including a plurality of first teeth on a radially outer surface, each of the first teeth having a drive engagement profile on a first tooth flank that faces in a first rotational direction and a cam profile on a second tooth flank;
a second gear plate rotationally fixed to the first shaft, the second gear plate including a plurality of second teeth on a radially outer surface, each of the second teeth having a drive engagement profile on a second tooth flank and a cam profile on a first tooth flank, the second tooth flanks of the plurality of second teeth facing in a second, opposite rotational direction from the first tooth flanks of the plurality of first teeth;
a pawl plate rotationally fixed to the second shaft;
a plurality of first pawls pivotally connected to the pawl plate, each first pawl having a first end that is configured to engage with a respective one of the drive engagement profiles on the first tooth flanks of the first teeth of the first gear plate in an engaged position and having a second actuation end, opposite the first end, that extends radially outwardly to an activated position and is movable radially inwardly to a deactivated position such that the first end is disengaged from the respective drive engagement profile on the first tooth flanks of the first teeth, and a first spring associated with each of the first pawls that biases the first ends of the first pawls into the engaged positions;
a plurality of second pawls pivotally connected to the pawl plate, each second pawl having a first end that is configured to engage with a respective one of the drive engagement profiles on the second tooth flanks of the second teeth of the second gear plate in an engaged position and having a second actuation end, opposite the first end, that extends radially outwardly to an activated position and is movable radially inwardly to a deactivated position such that the first end of the second pawl is disengaged from the respective drive engagement profiles on the second tooth flanks of the second teeth, and a second spring associated with each of the second pawls that biases the first ends of the second pawls into the engaged positions;
a first actuator ring that is axially movable between an actuated position, in which the second ends of the first pawls are in the activated position, and a disengaged position, in which the first actuator ring presses the second ends of the first pawls radially inwardly to the deactivated position such that the first ends of the first pawls are disengaged from the respective drive engagement profiles on the first tooth flanks of the first teeth; and
a second actuator ring that is axially movable between an actuated position, in which the second ends of the second pawls are in the activated position, and a disengaged position, in which the second actuator ring presses the second ends of the second pawls radially inwardly to the deactivated position such that the first ends of the second pawls are disengaged from the respective drive engagement profiles on the second tooth flanks of the second teeth.

2. The clutch of claim 1, wherein with the first and second actuator rings both in the actuated position, a fully locked connection is provided between the first and second shafts in both rotational directions, with the first actuator ring in the actuated position and the second actuator ring in the disengaged position, a one-way clutch is provided that is active for transferring force only in the first rotational direction, with the first actuator ring in the disengaged position and the second actuator ring in the actuated position, a one-way clutch is provided that is active for transferring force only in the second rotational direction, and with the first and second actuator rings both in the disengaged position, the first and second shafts are freely rotatable relative to one another in both rotational directions.

3. The clutch of claim 1, wherein the first and second actuator rings include splined radially inner surfaces that slidingly engage on a splined radially outer surface of the pawl plate.

4. The clutch of claim 1, further comprising at least one actuator connected to the first and second actuator rings to axially move the first and second actuator rings between the respective actuated and disengaged positions.

5. The clutch of claim 4, wherein the at least one actuator comprises respective first and second actuators that are engaged, respectively, with the first actuator ring and the second actuator ring.

6. The clutch of claim 5, wherein the first actuator comprises a first solenoid connected to a first fork that engages a groove in a radially outer surface of the first actuator ring, and the second actuator comprises a second solenoid connected to a second fork that engages a groove in a radially outer surface of the second actuator ring.

7. The clutch of claim 6, wherein the first fork is connected to a first solenoid shaft, and the first solenoid shaft includes detents for the actuated and disengaged positions of the first actuator ring, and the second fork is connected to a second solenoid shaft, and the second solenoid shaft includes detents for the actuated and disengaged positions of the second actuator ring.

8. The clutch of claim 1, wherein the first and second shafts are both rotatable.

9. The clutch of claim 1, wherein the pawl plate includes a plurality of pockets on each axial side, and the first pawls are located in the pockets on one of the axial sides, and the second pawls are located in the pockets on an opposite one of the axial sides from the first pawls.

10. The clutch of claim 1, wherein the first and second pawls are arranged in axially aligned pairs, and a single pivot pin connects each of the aligned pairs of the first and second pawls to the pawl plate.

11. The clutch of claim 1, wherein the first and second gear plates are rotationally fixed to the first shaft via a form fit or an interference fit.

12. The clutch of claim 1, wherein the second ends of the first pawls each include a first ramp surface, and at least a part of a radially inner surface of the first actuator ring includes a corresponding ramp surface that engages with the first ramp surfaces as the first actuator ring moves to the disengaged position.

13. The clutch of claim 12, wherein the second ends of the second pawls each include a second ramp surface, and at least a part of a radially inner surface of the second actuator ring includes a corresponding ramp surface that engages with the second ramp surfaces as the second actuator ring moves to the disengaged position.

14. A dual direction, selectable one-way clutch, comprising:
first and second concentric shafts;
a first gear plate rotationally fixed to the first shaft, the first gear plate including a plurality of first teeth on a radially outer surface, each of the first teeth having a drive engagement profile on a first tooth flank that faces in a first rotational direction and a cam profile on a second tooth flank;
a second gear plate rotationally fixed to the first shaft, the second gear plate including a plurality of second teeth on a radially outer surface, each of the second teeth having a drive engagement profile on a second tooth flank and a cam profile on a first tooth flank, the second tooth flanks of the plurality of second teeth facing in a second, opposite rotational direction from the first tooth flanks of the plurality of first teeth;
a pawl plate rotationally fixed to the second shaft;
a plurality of first pawls pivotally connected to the pawl plate, each first pawl having a first end that is configured to engage with a respective one of the drive engagement profiles on the first tooth flanks of the first teeth of the first gear plate in an engaged position and having a second actuation end, opposite the first end, that extends radially outwardly to an activated position and is movable radially inwardly to a deactivated position such that the first end is disengaged from the respective drive engagement profile on the first tooth flanks of the first teeth, and a first spring associated with each of the first pawls that biases the first ends of the first pawls into the engaged positions;
a plurality of second pawls pivotally connected to the pawl plate, each second pawl having a first end that is configured to engage with a respective one of the drive engagement profiles on the second tooth flanks of the second teeth of the second gear plate in an engaged position and having a second actuation end, opposite the first end, that extends radially outwardly to an activated position and is movable radially inwardly to a deactivated position such that the first end of the second pawl is disengaged from the respective drive engagement profiles on the second tooth flanks of the second teeth, and a second spring associated with each of the second pawls that biases the first ends of the second pawls into the engaged positions;
an actuator ring that is axially movable between:
a first actuated position, in which the second ends of the first pawls and the second ends of the second pawls are in the activated position providing a fully locked connection between the first and second shafts in both rotational directions;
a first one-way clutch position, in which the second ends of the first pawls are in the activated position and the second ends of the second pawls are in the deactivated position for transferring force only in the first rotational direction;
a second one-way clutch position, in which the second ends of the first pawls are in the deactivated position and the second ends of the second pawls are in the activated position for transferring force only in the second rotational direction; and
a freewheel position, in which the first and second pawls are in the deactivated position such that the first and second shafts are freely rotatable relative to one another in both rotational directions.

15. The clutch of claim 14, wherein the actuator ring includes a splined radially inner surfaces that slidingly engages on a splined radially outer surface of the pawl plate.

16. The clutch of claim 14, further comprising an actuator connected to actuator ring to axially move the actuator ring between the first actuated position, the first one-way clutch position, the second one-way clutch position, and the freewheel position.

17. The clutch of claim 16, wherein the actuator comprises a solenoid connected to a fork that engages a groove in a radially outer surface of the actuator ring.

18. The clutch of claim 17, wherein the fork is connected to a solenoid shaft, and the solenoid shaft includes detents for the first actuated position, the first one-way clutch position, the second one-way clutch position, and the freewheel position.

19. The clutch of claim 14, wherein the pawl plate includes a plurality of pockets on each axial side, and the first pawls are located in the pockets on one of the axial sides, and the second pawls are located in the pockets on an opposite one of the axial sides from the first pawls.

20. The clutch of claim 14, wherein the first and second pawls are arranged in axially aligned pairs, and a single pivot pin connects each of the aligned pairs of the first and second pawls to the pawl plate.

* * * * *